United States Patent
Tiburtius et al.

(10) Patent No.: US 6,845,153 B2
(45) Date of Patent: Jan. 18, 2005

(54) NETWORK INDEPENDENT PARTY ADDRESSING USING A UNIQUE IDENTIFIER LINKED TO NETWORK SPECIFIC ADDRESSES

(75) Inventors: Akilan Tiburtius, Montreal (CA); Hanz Hager, Le Plessis Robinsson (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 660 days.

(21) Appl. No.: 09/773,466

(22) Filed: Jan. 31, 2001

(65) Prior Publication Data

US 2002/0101975 A1 Aug. 1, 2002

(51) Int. Cl.[7] .................................. H04M 3/42
(52) U.S. Cl. ..................... 379/221.01; 379/211.01; 379/220.01
(58) Field of Search ................ 379/142.01, 201.02, 379/201.01, 220.01, 221.08

(56) References Cited

U.S. PATENT DOCUMENTS

| | | | |
|---|---|---|---|
| 6,014,711 A | 1/2000 | Brown | 709/245 |
| 6,052,736 A | 4/2000 | Ogle et al. | 709/244 |
| 6,069,945 A | 5/2000 | Brown et al. | 379/220 |
| 6,160,877 A | * 12/2000 | Tatchell et al. | 379/197 |

* cited by examiner

Primary Examiner—Harry S. Hong
Assistant Examiner—Hector A. Agdeppa
(74) Attorney, Agent, or Firm—Jenkens & Gilchrist

(57) ABSTRACT

A party is identified with a network independent address. That address is linked to a plurality of network specific addresses. In the context of originating a communication toward that party, the network independent address is used as the dialed address. A context for the origination, which identifies the type of communication being originated (for example, voice call, data call, e-mail, and the like) and/or the network over which the originated communication is to occur, is included with the network independent address in the origination. The network independent address is used to identify the plurality of associated network specific addresses, and the context is used to select a certain one of those network specific addresses. The selected network specific address is then used to route the origination to the party. Completion of the origination using the selected network address may be controlled by either the network or terminal.

38 Claims, 2 Drawing Sheets

NETWORK INDEPENDENT PARTY ADDRESSING USING A UNIQUE IDENTIFIER LINKED TO NETWORK SPECIFIC ADDRESSES

BACKGROUND OF THE INVENTION

1. Technical Field of the Invention

The present invention relates to the provision of communications services and, in particular, to the addressing of a party through use of a network independent address.

2. Description of Related Art

The manner with which a party is addressed for communications service has historically been network specific. Take, for example, the concept of party addressing in a conventional telephony (voice or fax service) type of communications network. A party in the telephone network is addressed by a set of numeric digits having a certain format (i.e., the party's dialable phone or fax number). Conversely, in a data communications network like the Internet, a party is addressed by a collection of numeric digits arranged in a certain format (i.e., the party's Internet address). Finally, for purposes of e-mail communications, a party is addressed by a collection of alphanumeric characters having a certain format (i.e., the party's e-mail address).

The network specific formats for party addressing in different networks often share nothing in common, and thus each address, even if assigned to the same party, is limited for use in contacting that party only within the network for which the address is valid. In this regard, conventional network address handling procedures do not allow a telephone network to route a voice or fax call to a called party based on a caller specification of the e-mail address for that called party. Similarly, the prior art data communications network does not possess the ability to route a data message to an addressee party based on an addressor specification of a telephone number for the addressee party. Because of these limitations, a party must not only keep separate addresses for each network, but he must also make each of those addresses known to those persons having a desire to contact him.

There is a significant interest in the communications industry, especially with the proliferation of many different kinds of communications services (voice, data, e-mail, fax, and the like), to move towards an addressing solution where a party would be assigned a unique, world-wide address that is usable for routing communications of any type and in any network. While progress is being made in this area, the legacy solution of having a different party address assigned in each network remains in effect, and an interim solution is needed to bring an improved level of convenience to the issue of party addressing as technology moves towards unique party identifications.

SUMMARY OF THE INVENTION

A network independent address is assigned to a party, with that address being linked to a plurality of network specific addresses. Responsive to an origination directed toward the network independent address of the party, that address is used to identify the associated plurality of network specific addresses. A certain one of those identified addresses is then selected based on a specified context of the origination wherein the context refers to the type of communication being originated and/or the network over which the originated communication is to occur. The origination is then completed to the party using the selected network specific address.

More specifically, in the context of an intelligent network solution, a switching node serving a first party that originates a communication toward the network independent address triggers execution of a translation functionality to select the network specific address of a second party. This selected address is then used by the serving switching node to complete the originated communication to the second party.

Furthermore, in the context of a serving third generation network solution, a server responds to a first party origination of a communication toward the network independent address by triggering execution of a translation functionality to select the network specific address of a second party. This selected address is then returned to the originating first party terminal. The terminal then uses the selected address to complete the originated communication to the second party.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
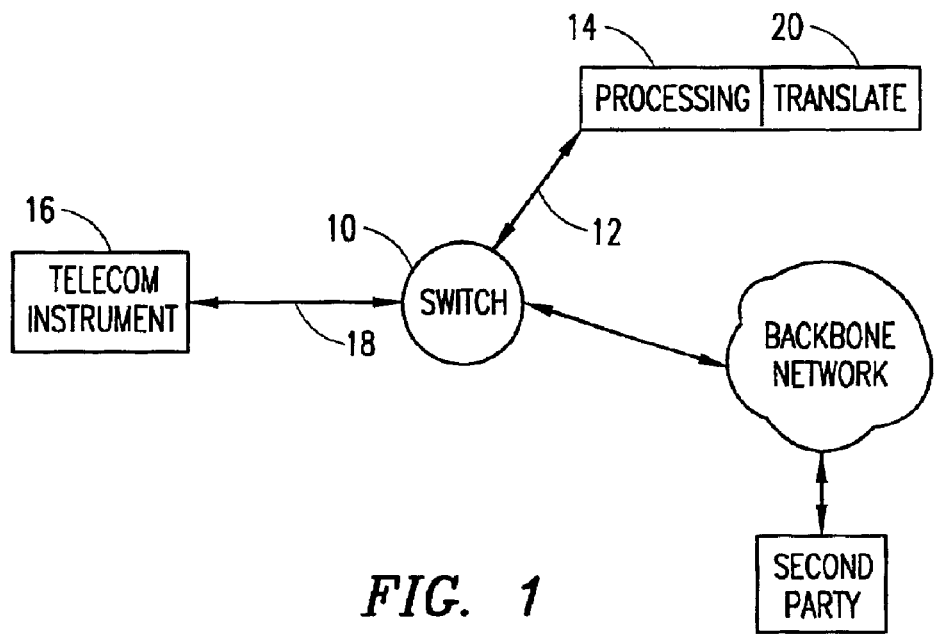
FIG. 1 is a block diagram of an intelligent network solution for handling network independent party addressing in a legacy telephone network.

Reference is now made to FIG. 1 wherein there is shown a block diagram of an intelligent network solution for handling network independent party addressing. The structure and operation of an intelligent network (IN) is well known to those skilled in the art and thus detailed explanation of IN concepts and operations is outside the context of the present invention and will not be presented. The network includes a switching node 10 (which may comprise a service switching point—SSP) connected by signaling links 12 to a processing node 14 (which may comprise a service control point—SCP). To simplify the drawing figure, only one of many switching nodes 10 included in the network is illustrated, and not all potential interconnections between nodes are illustrated.

A user telecommunications instrument 16 is connected to the switching node 10 by any conventional wireline or wireless interface technology 18. For example, in the context of a wireless intelligent network (WIN) implementation, the wireless interface technology 18 may include a base station (BS—not explicitly illustrated) possessing a signaling and voice/data connection to the switching node and supporting a wireless radio frequency air interface (D-AMPS, GSM, PCS, CDMA, EDGE, and the like) connection to the telecommunications instrument 16. Conversely, in the context of a wireline implementation, the interface technology 18 may comprise appropriate subscriber line interface cards (not explicitly illustrated).

The switching node 10 is connected, either directly or through other nodes, to a backbone communications network (such as, for example, a public land mobile network (PLMN), a public switched telephone network (PSTN), an internet protocol (IP) network, an asynchronous transfer mode (ATM) network, or the like). Through the backbone communications network, access is provided for communications to other networks. A party has a network specific address in at least one of those other networks as well as a network specific address in the intelligent network itself. For example, in a telephony-type network a party would have a network specific address comprising a telephone number. Still further, and again at the same time, in yet another network (for example, the IP network) that same party may have another, different network specific address comprising an e-mail address. In order to make contact with that party, a user must inconveniently remember (or have access to) each of these network specific addresses, and must further utilize the proper one in connection with the handling of a communication in each network.

The processing node 14 includes a translation functionality 20 that operates to translate from a unique, network independent, address for a certain party to one of the network specific addresses for that certain party. The unique, network independent, address is supplied by a user in connection with an origination of a communication that is to be directed to that certain party. In this regard, an advantage over prior art addressing schemes is presented in that the user need not know anything about any of the network specific addresses for that certain party. Thus, the use of the network independent address provides a significant improvement in ease of use and access for the user when originating communications. The address information contained in the origination is delivered to the processing node 14 where the translation functionality 20 identifies one of the network specific addresses for use in further handling the originated communication. The determination of which of the plurality of network specific addresses is to be used (in connection with the supplied network independent address) is determined by an indication, also provided by the user in the origination, of a context for the communication. The term "context" refers to an identification of the type of communication being made (for example, telephone call, fax call, e-mail, and the like) and/or the network over which the communication is to occur (PLMN, PSTN, IP, and the like). A more detailed explanation of this process is provided below in connection with the discussion of FIG. 2.

To support network independent addressing for a party, the user telecommunications instrument 16 must possess the capability to originate communications with the transmission of that network independent address. In many, if not most, implementations, the unique network independent address will have an alphanumeric format and thus the telecommunications instrument 16 and the supporting interface technology 18 must support the sending of such alphanumeric identifiers to the switching node 10 for further handling in connection with communications set-up and delivery. For example, in the context of a wireless intelligent network solution, the mobile station comprising the terminal must be capable of dialing (from the keypad or from an autodialer, contact list or speed-dialing functionality) such a contacted party network independent address and incorporating that address in an appropriate call origination message sent over the air interface. At the same time, the air interface specification may need to be configured to support such a call origination. In this regard, the length of the network independent address may be restricted by called party parameter size limitations of the implicated air interface specification. A similar analysis holds true with respect to a wireline implementation in that the operational requirements of the wireline interface (through a subscriber line interface card, for example) may place some restrictions on the nature of the network independent address that is used to identify the contacted party. Also, it is recognized that the terminal must be capable of dialing (as discussed above with the mobile terminal) that unique network independent address.

Figure 2:
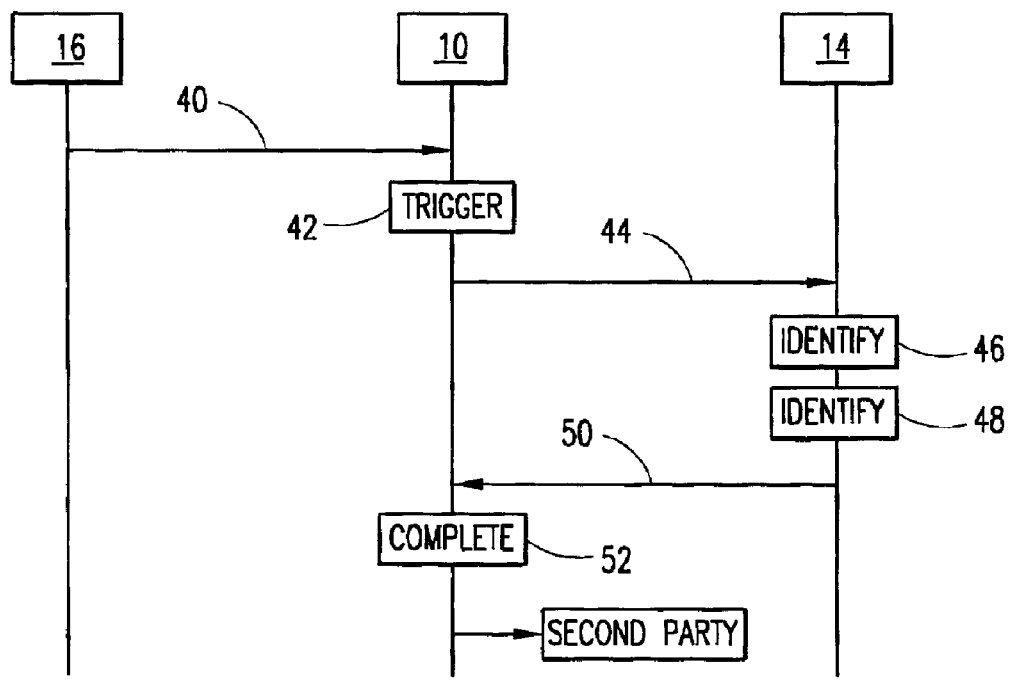
FIG. 2 is a flow diagram for an intelligent network process for handling an origination with a network independent address.

Reference is now made to FIG. 2 wherein there is shown a sequence diagram for an intelligent network process for handling an origination with a network independent address. The telecommunications instrument 16 of a first party originates 40 a communication dialed toward the network independent address of a second party. This origination in the context of the telephony-based intelligent network of FIG. 1 may comprise any standard call origination message modified in accordance with the present invention to specify the second party using its network independent address and to further specify a context for the originated communication. Again, as discussed above, the "context" of the originated communication refers to an identification of the type of communication being made (for example, telephone call, fax call, e-mail, and the like) and/or the network over which the communication is to occur (PLMN, PSTN, IP, and the like). The origination 40 is processed by the switching node 10 where an intelligent network trigger detection point is implicated 42 by the contents of the origination with respect to the first party. This causes the switching node 10 to make a request 44 of the processing node 14 for translation of the network independent address. The request 44 includes both the network independent address and the specified context for the first party originated communication. In this illustrated intelligent network implementation, the request 44 may, for example, comprise an origination request (ORREQ) message, or similar IN message, as is well known in the art and further modified to include the needed address and context information. At the processing node 14, the network independent address of the second party is used to identify 46 (through, perhaps, a database look-up operation) the corresponding plurality of network specific addresses. The context is then used to identify 48 (through, perhaps, a filtering operation) which specific one of those plurality of addresses is to be used in connection with the originated communication. The derived (actions 46 and 48) network specific address for the second party is then returned 50 to the switching node 10 and conventional communications origination processing (generally, action 52, and perhaps comprising processing in accordance with the originating-basic call state model-O-BCSM) is performed at the switching node to complete the requested communication. The action 52 taken to complete the communication may require the accessing of, and the routing through, a network other than the intelligent network where the call is originated.

The process of FIG. 2 may be better understood through the examination of some specific examples. In each of the examples, the following assumptions are made: the second party has a network independent address of secondparty@in.net, a network specific address (dialable number) for voice calls in the intelligent network of 214-555-1234, a network specific address (dialable number) for fax calls in the intelligent network 214-555-4321, and a network specific address (e-mail) in the IP network for data messaging of secondparty@bigcorp.com.

In a first example, the first party desires to contact a second party to engage in a voice call. The telecommunications instrument 16 of the first party originates 40 a communication dialed toward secondparty@in.net. The use of the term "dialed" in this context assumes that the instrument is capable of originating a communication through the specification of something other than a conventional dialable telephone number. This origination not only specifies the second party using its network independent address, but further specifies a context for the originated communication which in the present scenario is a voice call. At the switching node 10, an intelligent network trigger detection point is triggered (action 42) causing a translation request 44 (including both the network independent address and the specified context) to be made of the processing node 14. The processing node 14 then identifies 46 the network specific addresses of the second party (214-555-1234, 214-555-4321, and secondparty@bigcorp.com) from the network independent address and uses the specified context (voice call) to select (in action 48) the network specific address of 214-855-1234 for a voice call. This derived network specific address for the second party is then returned 50 to the switching node 10. Conventional voice call set-up and delivery actions within the intelligent network (generally, action 52) are then performed by the switching node to complete the requested communication for a voice call.

In a second example, the first party desires to contact a second party to engage in a fax call. The telecommunications instrument 16 of the first party originates 40 a communication dialed toward secondparty@in.net. This origination not only specifies the second party using its network independent address, but further specifies a context for the originated communication which in the present scenario is a fax call. At the switching node 10, an intelligent network trigger detection point is triggered (action 42) causing a translation request 44 (including both the network independent address and the specified context) to be made of the processing node 14. The processing node 14 then identifies 46 the network specific addresses of the second party (214-555-1234, 214-555-4321, and secondparty@bigcorp.com) from the network independent address and uses the specified context (fax call) to select (in action 48) the network specific address of 214-855-4321 for a fax call. This derived network specific address for the second party is then returned 50 to the switching node 10. Conventional fax call set-up and delivery actions within the intelligent network (generally, action 52) are then performed by the switching node to complete the requested communication for a fax call.

Lastly, in a third example, the first party desires to contact a second party to engage in an e-mail communication. The telecommunications instrument 16 of the first party originates 40 a communication dialed (i.e., addressed) toward secondparty@in.net. This origination not only specifies the second party using its network independent address, but further specifies a context for the originated communication which in the present scenario is an e-mail. Given that the request is for an e-mail, the origination further includes the actual e-mail message content itself. At the switching node 10, an intelligent network trigger detection point is triggered (action 42) causing a translation request 44 (including both the network independent address and the specified context) to be made of the processing node 14. The processing node 14 then identifies 46 the network specific addresses of the second party (214-555-1234, 214-555-4321, and secondparty@bigcorp.com) from the network independent address and uses the specified context (e-mail call) to select (in action 48) the network specific address of secondparty@bigcorp.com for the e-mail. This derived network specific address for the second party is then returned 50 to the switching node 10. Conventional e-mail set-up and delivery actions within the intelligent network and reaching to the internet protocol network (generally, action 52) are then performed at the switching node to complete the requested communication for an e-mail delivery.

In a preferred embodiment, the network independent address is assigned to the second party by the service provider for the supporting network. In the specific example FIGS. 1 and 2, this would comprise the service provider for the intelligent network (and hence the top and second level domains of "net" and "in," respectively, in the network independent address). Although the preferred embodiment utilizes an e-mail address format for the network independent address, it should be understood that any suitable address format may be used.

It has also been mentioned that a preference exists for the use of a network independent address. The use of the phrase "network independent" need not necessarily imply that the address is not a routable address in any network. It is possible, especially if the address has an e-mail type format, for the network independent address to be a routable e-mail address. The restriction to "network independent" when referring to the second party address is rather to be construed as an identification of an address for a party that is associated (or linked) with a plurality of network specific addresses. A possibility exists for that network independent address to also be capable of being routable in one specific network, with the linked network specific addresses being used to route in connection with other networks.

Handling in the manner described above in connection with FIGS. 1 and 2 ensures that routing continues to be implemented in accordance with network specific addresses. This solution is therefore completely compatible with legacy networks. To handle routing in any other fashion would implicate unwanted and significant changes in the routing analysis operations performed by legacy networks. An advantage provided by the solution is that it preserves legacy routing while simultaneously introducing parties to the concept of unique and network independent party addressing that may be common-place in future network implementations.

Figure 3:
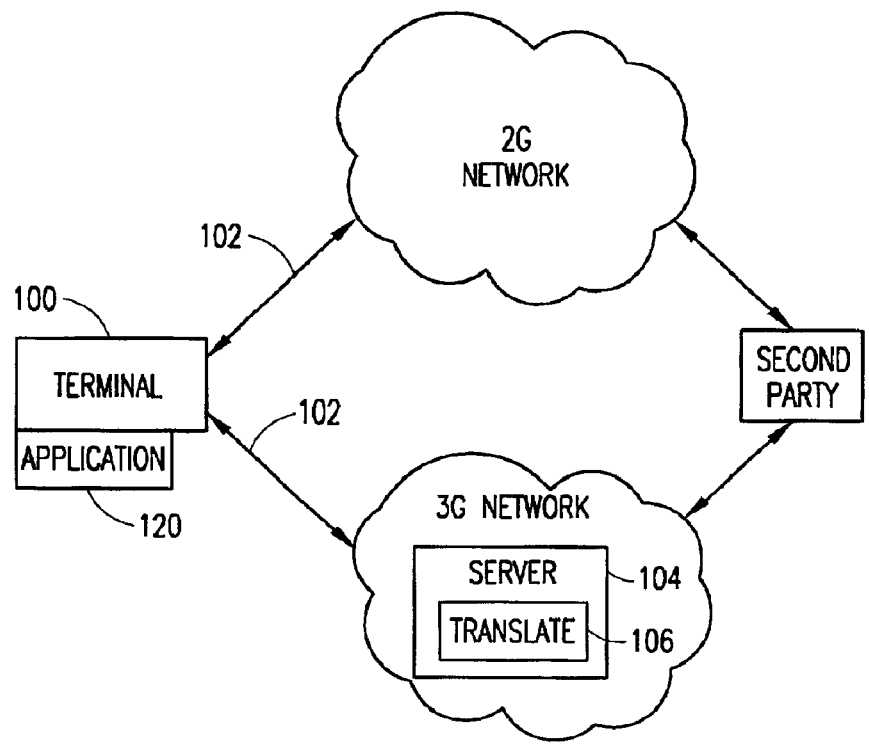
FIG. 3 is a block diagram of a combined second generation (2G) and third generation (3G) wireless network solution for handling network independent party addressing.

Reference is now made to FIG. 3 wherein there is shown a block diagram of a combined second generation (2G) and third generation (3G) wireless network solution for handling network independent party addressing. It is recognized that during the changeover from 2G to 3G networking, coexistence of both networks will exist for a time. Generally speaking, the 2G networks comprise those networks operating in accordance with circuit switched technologies while the 3G networks comprise those networks operating in accordance with packet switched technologies. Given the current state of packet switched technologies, voice calls are preferably established over the 2G network, while all other data related communications (e-mail, fax, file transfer, and the like) are established over the 3G network. The structure and operation of 2G (for example, D-AMPS, GSM, PCS and the like) wireless telecommunications networks and 3G (for example, EDGE, GPRS, W-CDMA, CDMA2000, and the like) wireless telecommunications networks is well known to those skilled in the art and thus detailed explanation of networking concepts and operations is outside the context of the present invention and will not be presented.

A party has a network specific address in both the 2G and the 3G network as well as, perhaps, in other networks. For example, in the 2G network the party has a network specific address comprising a telephone number. At the same time, in the 3G network, that same party may have another, different network specific address comprising an e-mail address. In order to make contact with that party, a user must inconveniently remember (or have access to) each of these network specific addresses, and must further utilize the proper one in connection with the handling of a communication over each network.

A user telecommunications instrument 100 (typically comprising a Class B terminal) is connected to the 2G/3G networks by any conventional 2G/3G wireless interface technology 102. For example, in the context of the 2G network implementation, the wireless interface technology 102 may include a base station (BS—not explicitly shown) possessing a signaling and voice/data connection to the network and supporting a wireless radio frequency air interface (D-AMPS, GSM, PCS, CDMA, and the like) 102 connection to the telecommunications instrument. Similarly, in the context of the 3G network implementation, the interface technology 102 may comprise a base station (BS—not explicitly shown) possessing a signaling and voice/data connection to the network and supporting a wireless radio frequency air interface (GPRS, W-CDMA, CDMA2000, and the like) connection to the telecommunications instrument 100.

The 3G network further includes a server 104 having a translation functionality 106 that operates to translate from a unique, network independent, address for a certain party to one of the network specific addresses for that certain party. The unique, network independent, address is supplied by a user in connection with an origination of a communication directed to that certain party. In this regard, the user need not know anything about any of the network specific addresses for that certain party. The use of the network independent address thus provides a significant improvement in ease of use and access for the user when originating communications. The address information contained in the origination is delivered over a 3G packet session to the server 104 where the translation functionality 106 identifies one of the network specific addresses for use in further handling the originated communication. The determination of which of the plurality of network specific addresses is to be used is driven by an indication, also provided by the user in the origination, of a context for the communication. The term "context" refers to the type of communication being made (for example, telephone call, fax call, e-mail, and the like) and/or the network over which the communication is to occur (2G, 3G, and the like). A more detailed explanation of this process is provided below in connection with the discussion of FIG. 4.

To support network independent addressing for a party, the user telecommunications instrument 100 must possess the capability to originate communications with the transmission of that network independent address. In many, if not most, implementations, the network independent address will have an alphanumeric format and thus the telecommunications instrument 100 and the supporting interface technology 102 must support the sending of such alphanumeric identifiers to the 2G/3G network for further handling. For example, the preferred Class B terminal must be capable of dialing (from the keypad or from an autodialer, contact list or speed-dialing functionality) such a contacted party network independent address and incorporating that address in an appropriate call origination message sent over the air interface. At the same time, the air interface specification must be configured to support such a call origination. In this regard, the length of the network independent address may be restricted by called party parameter size limitations of the implicated air interface specification. Also, it is recognized that the terminal must be capable of dialing (as discussed above) that network independent address.

Figure 4:
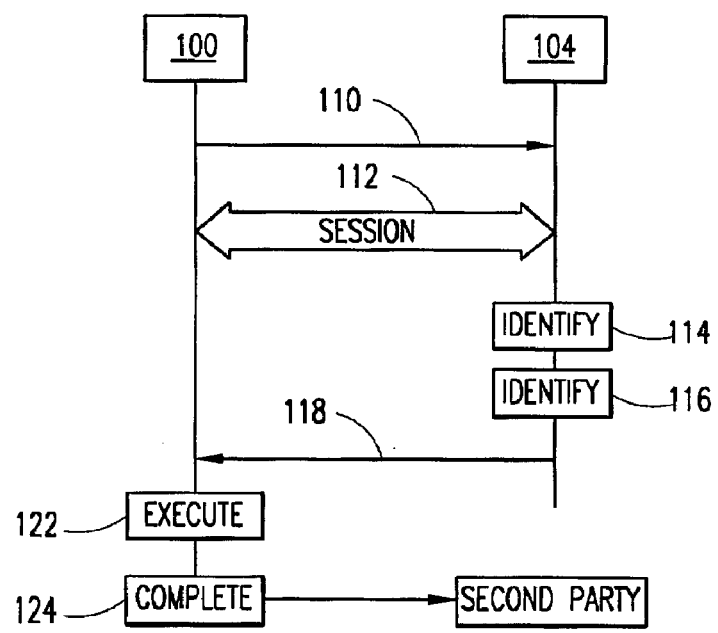
FIG. 4 is a flow diagram for a 2G/3G network process for handling an origination with a network independent address.

Reference is now additionally made to FIG. 4 wherein there is shown a flow diagram for a 2G/3G network process for handling an origination with a network independent address. The telecommunications instrument 100 of a first party is camped on to the packet control channel of the 3G network. An origination 110 of a communication dialed toward the network independent address of a second party is then made. A packet session 112 is established between the telecommunications instrument 100 and the 3G network to support communication of the unique identifier and context to the server 104. Again, as discussed above, the "context" of the origination 110 refers to the type of communication being made (for example, telephone call, fax call, e-mail, and the like) and/or the network over which the communication is to occur (2G, 3G, and the like). Using the translation functionality 106, the server 104 uses the network independent address of the second party to identify 114 (perhaps through a look-up operation) the corresponding plurality of network specific addresses. The context is then used to identify 116 (perhaps through a filtering operation) which specific one of those plurality of addresses is to be used in connection with the originated communication. The derived (actions 114 and 116) network specific address for the second party is then returned 118 to the telecommunications instrument 100 over the packet session 112. An application 120 in the telecommunications instrument 100 is then executed 122 to utilize the received network specific address to complete 124 a communication with the second party. The action 124 taken to complete the communication may require the accessing and routing through a network other than the 3G network (for example, the 2G network).

The process of FIG. 4 may be better understood through the examination of some specific examples. In each of the examples, the following assumptions are made: the second party has a network independent address of secondparty@servprov.net, a network specific address (dialable number) for voice calls in the 2G network of 214-555-1234, and a network specific address (e-mail) accessed through the 3G network (and perhaps over the internet protocol network) for data messaging of secondparty@bigcorp.com.

In a first example, the first party desires to contact a second party to engage in a voice call. The telecommunications instrument 100 of the first party is camped on to the 3G network packet control channel. A call origination 110 dialed toward secondparty@servprov.net is made over the packet control channel with the 3G network and a packet session 112 is established. The use of the term "dialed" in this context includes a Class B terminal capability of originating a communication through the specification of something other than a conventional dialable telephone number. This origination not only specifies the second party using its network independent address, but further specifies a context for the originated communication which in the present scenario is a voice call. At the server 104, the translation functionality 106 then identifies 114 the network specific addresses of the second party (214-555-1234, and secondparty@bigcorp.com) from the network independent address and uses the specified context (voice call) to select (in action 116) the network specific address of 214-855-1234. This derived network specific address for the second party is then returned 118 to the telecommunications instrument 100. Conventional voice call set-up and delivery actions within the 2G network (generally, action 124) are then performed to complete the requested communication for a voice call.

In a second example, the first party desires to contact a second party to engage in an e-mail communication. The telecommunications instrument 100 of the first party is camped on to the 3G network packet control channel. A call origination 110 dialed toward secondparty@servprov.net is made over the packet control channel within the 3G network and a packet session 112 is established. This origination not only specifies the second party using its network independent address, but further specifies a context for the originated communication which in the present scenario is a 3G network supported e-mail communication. At the server 104, the translation functionality 106 then identifies 114 the network specific addresses of the second party (214-555-1234, and secondparty@bigcorp.com) from the network independent address and uses the specified context (e-mail communication) to select (in action 116) the network specific address of secondparty@bigcorp.com. This derived network specific address for the second party is then returned 118 to the telecommunications instrument 100. Conventional e-mail set-up and delivery actions through the 3G network (generally, action 124, and perhaps through the internet protocol network) are then performed to complete the requested communication for an e-mail communication.

In a preferred embodiment, the network independent address is assigned to the second party by the service provider for the supporting 2G/3G networks. In the specific example FIGS. 3 and 4, this would comprise the service provider for the 2G/3G network (and hence the top and second level domains of "net" and "servprov," respectively, in the network independent address). Although the preferred embodiment utilizes an e-mail address format for the network independent address, it should be understood that any suitable address format may be used.

Handling in the manner described above in connection with FIGS. 3 and 4 ensures that routing continues to be implemented in accordance with network specific addresses. This solution is therefore completely compatible with legacy 2G networks. To handle routing in any other fashion would implicate unwanted but significant changes in the routing analysis operations performed by legacy networks. An advantage provided by the solution is that it preserves legacy routing while simultaneously introducing parties to the concept of unique and network independent party addressing that may be common-place in future network implementations (like 3G networks).

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An intelligent network method, comprising the steps of:
   receiving an origination from a first party, the origination addressed to a second party using a network independent address that is linked to a plurality of network specific addresses for the second party, the origination further including a context for the origination;
   triggering from the received origination a request for translation of the network independent address to a selected one of the plurality of network specific addresses;
   translating the network independent address to the selected one of the plurality of network specific addresses based on the specified context for the origination; and
   completing the origination toward the second party using the selected one of the plurality of network specific addresses.

2. The method of claim 1 wherein the receiving, triggering and completing are performed in an intelligent network switching node.

3. The method of claim 2 wherein the step of translating is performed in an intelligent network processing node.

4. The method of claim 1 wherein the context identifies a type of communication being originated.

5. The method of claim 4 wherein the type of communication comprises one of a voice call, a data call, and an e-mail transmission.

6. The method of claim 1 wherein the context identifies a network over which the originated communication is to occur.

7. The method of claim 6 wherein the network comprises one of a public switched telephone network, a public land mobile network, and an internet protocol network.

8. An intelligent network, comprising:
   a switching node serving a first party that originates a communication addressed to a second party using a network independent address that is linked to a plurality of network specific addresses for the second party, the origination further including a context for the origination, the switching node triggering from the received origination a request for translation of the network independent address to a selected one of the plurality of network specific addresses; and
   a processing node responsive to the triggering to translate the network independent address to the selected one of the plurality of network specific addresses based on the specified context for the origination;
   wherein the switching node completes the origination toward the second party using the selected one of the plurality of network specific addresses.

9. The network of claim 8 wherein the switching node comprises a service switching point.

10. The network of claim 9 wherein the processing node comprised a service control point.

11. The network of claim 8 wherein the context identifies a type of communication being originated.

12. The network of claim 11 wherein the type of communication comprises one of a voice call, a data call, and an e-mail transmission.

13. The network of claim 8 wherein the context identifies a transmission network over which the originated communication is to occur.

14. The network of claim 13 wherein the transmission network comprises one of a public switched telephone network, a public land mobile network, and an internet protocol network.

15. A method, comprising the steps of:
   establishing a packet data session with a first party terminal to support origination of a communication addressed to a second party using a network independent address that is linked to a plurality of network specific addresses for the second party, the origination further including a context for the origination;
   translating the network independent address to a selected one of the plurality of network specific addresses based on the specified context for the origination; and
   returning the selected one of the plurality of network specific addresses to the first party terminal over the packet data session for terminal use in completing the communication origination towards the second party.

16. The method of claim 15 wherein the context identifies a type of communication being originated.

17. The method of claim 16 wherein the type of communication comprises one of a voice call, a data call, and an e-mail transmission.

18. The method of claim 15 wherein the context identifies a network over which the originated communication is to occur.

19. The method of claim 18 wherein the network comprises one of a public switched telephone network, a public land mobile network, and an internet protocol network.

20. A system, comprising the steps of:
a third generation wireless network operating to establish a packet data session with a first party terminal to support origination of a communication addressed to a second party using a network independent address that is linked to a plurality of network specific addresses for the second party, the origination further including a context for the origination; and
a server within the third generation wireless network that translates the network independent address to a selected one of the plurality of network specific addresses based on the specified context for the origination;
wherein the third generation network returns the selected one of the plurality of network specific addresses to the first party terminal over the packet data session for terminal use in completing the communication origination towards the second party.

21. The system of claim 20 wherein the context identifies a type of communication being originated.

22. The system of claim 21 wherein the type of communication comprises one of a voice call, a data call, and an e-mail transmission.

23. The system of claim 20 wherein the context identifies a network over which the originated communication is to occur.

24. The system of claim 23 wherein the network comprises one of a public switched telephone network, a public land mobile network, and an internet protocol network.

25. The system of claim 20 wherein the first party terminal includes an application executed responsive to the returned selected one of the plurality of network specific addresses to complete an origination toward the second party over a network other than the third generation network.

26. The system of claim 25 wherein the other network comprises a second generation wireless network.

27. A switching node that receives an origination from a first party, wherein that origination is addressed to a second party using a network independent address that is linked in a database to a plurality of network specific addresses for the second party, and wherein the origination further includes a context for the origination, and the node operating to:
trigger from the received origination a translation of the network independent address to a selected one of the database stored plurality of network specific addresses based on the specified context for the origination; and
complete the origination toward the second party using the selected one of the plurality of network specific addresses.

28. The node of claim 27 wherein the translation is performed by the switching node itself.

29. The node of claim 27 wherein the context identifies a type of communication being originated.

30. The node of claim 29 wherein the type of communication comprises one of a voice call, a data call, and an e-mail transmission.

31. The node of claim 27 wherein the context identifies a network over which the originated communication is to occur.

32. The node of claim 31 wherein the network comprises one of a public switched telephone network, a public land mobile network, and an internet protocol network.

33. The node of claim 31 wherein the node comprises an intelligent network (IN) switching node.

34. A third generation wireless network call handling node operating to:
establish a packet data session with a first party terminal to support origination of a communication addressed to a second party using a network independent address that is linked to a plurality of network specific addresses for the second party, the origination further including a context for the origination;
request translation of the network independent address to a selected one of the plurality of network specific addresses based on the specified context for the origination; and
returns the selected one of the plurality of network specific addresses to the first party terminal over the packet data session for terminal use in completing the communication origination towards the second party.

35. The node of claim 34 wherein the context identifies a type of communication being originated.

36. The node of claim 35 wherein the type of communication comprises one of a voice call, a data call, and an e-mail transmission.

37. The node of claim 34 wherein the context identifies a network over which the originated communication is to occur.

38. The node of claim 37 wherein the network comprises one of a public switched telephone network, a public land mobile network, and an internet protocol network.

* * * * *